United States Patent
Hansen

[15] 3,668,932
[45] June 13, 1972

[54] GRAVITY GRADIENT METER

[72] Inventor: Siegfried Hansen, Los Angeles, Calif.

[73] Assignee: Hughes Aircraft Company, Culver City, Calif.

[22] Filed: Dec. 4, 1970

[21] Appl. No.: 95,230

[52] U.S. Cl. ............................................................ 73/382
[51] Int. Cl. ....................................................... G01v 7/00
[58] Field of Search .............................. 33/211, 206; 73/382

[56] References Cited

UNITED STATES PATENTS 3,409,993  11/1968  Hansen ................................... 33/211
2,732,717  1/1956   Rothacker ............................... 73/382

Primary Examiner—James J. Gill
Attorney—W. H. MacAllister, Jr. and Allen A. Dicke, Jr.

[57] ABSTRACT

A resilient member is provided with first and second local gravity vector determining devices secured thereto and spaced thereon. Force means is attached to the bar to bend it. The output of the local gravity vector determining devices is connected to the force means so that the resilient member is bent so that each of the gravity vector determining devices is oriented so that the local gravity vector is parallel to its reference axis. The local gravity vector determining device is a bubble level operating under a flat surface, with electrodes determining bubble position. Four force motors positioned around a stiff central spring deflect the member.

12 Claims, 3 Drawing Figures

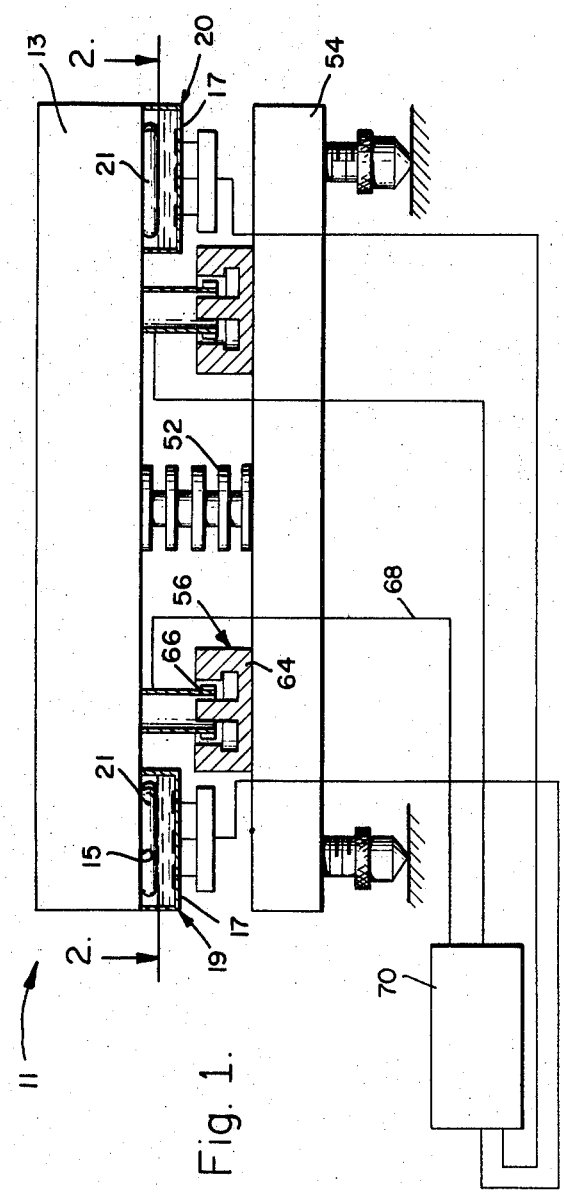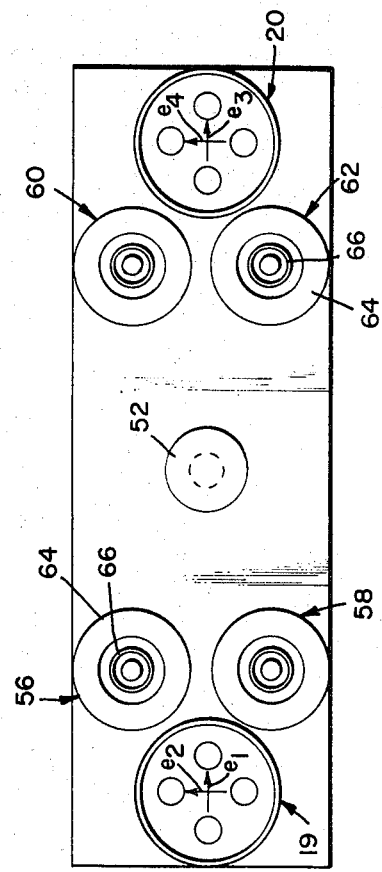

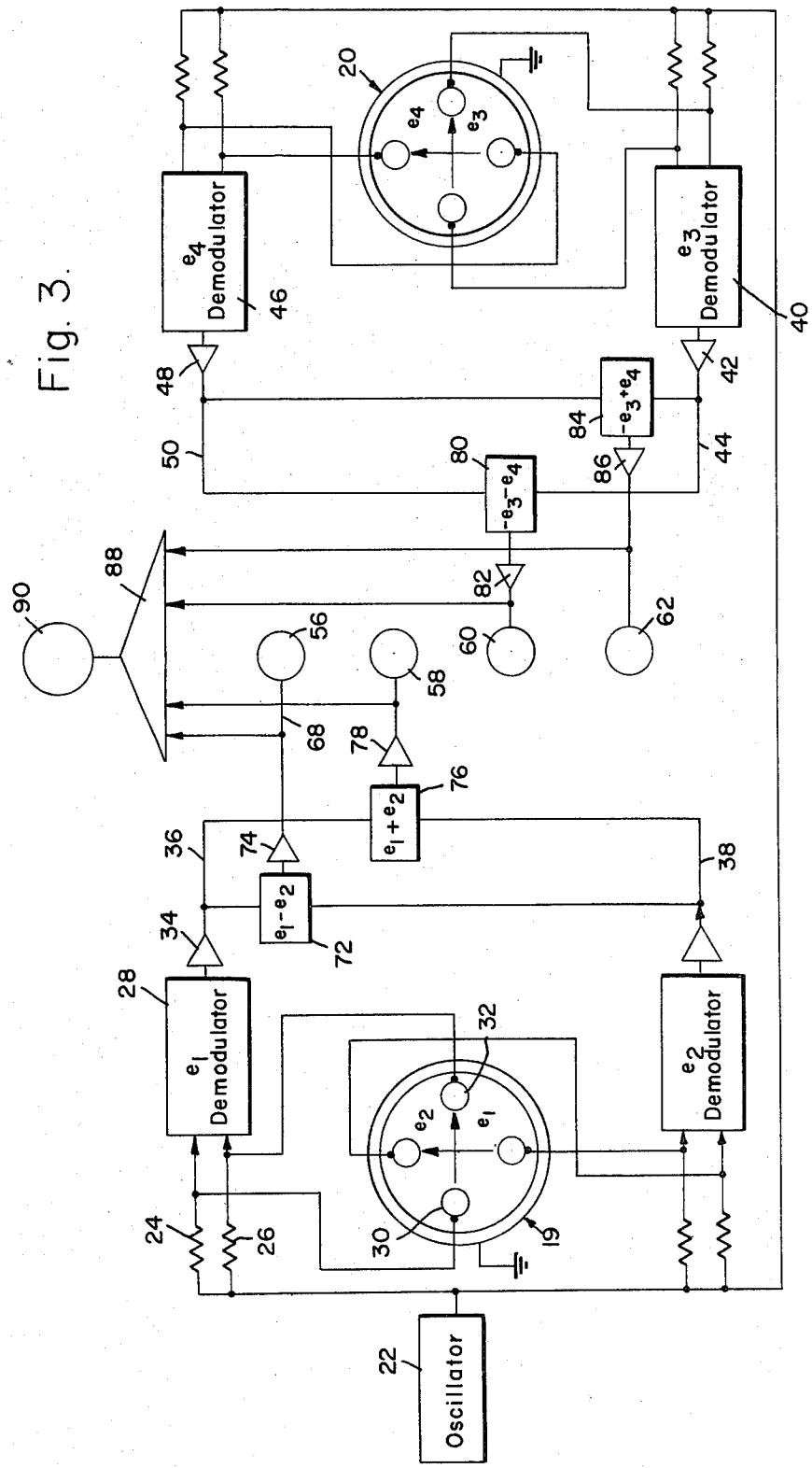

GRAVITY GRADIENT METER

BACKGROUND

This invention is directed to a gravity gradient meter of the type wherein spaced local gravity vector determining devices are compared to find the gravity gradient therebetween.

The measurement of gravity gradients is of great importance in several technological areas. For example, the mapping of horizontal and vertical gradients finds applications in geophysical investigations, such as prospecting for oil and other minerals.

The phenomena of gravity gradients, their cause, effects, and means for recording them can best be understood by noting that, in the case of an ideal non-rotating earth having no tangential variations of density, the gravity acceleration vector would be everywhere directed toward the center of the earth; that is, perpendicular to the spherical surface. The introduction of rotation adds centrifugal force to the gravitational force with the result that the total acceleration vector is everywhere perpendicular to an oblate spheroid. In the actual earth, further variations in the local density cause local deviations from the ideal spheroidal pattern. These deviations in direction, along with the corresponding changes in intensity, are known as gravity anomalies.

A practical approach to the mapping of anomalies lies in the measurement of various differential quantities or gradients of the gravity components. In the frame of reference of the ideal spheroid, the small departures of the local gravity vector from the perpendicular direction result in small tangential components of gravity.

The bubble sensor, disclosed in my prior patents, U.S. Pat. Nos. 3,409,993 and 3,486,238, provides an instrument which is highly sensitive to tangential acceleration. Experimental evidence shows that this sensitivity extends to at least $10^{-9}$ g, while theoretical calculations of the fundamental Brownian movement indicate an ultimate limit of the order of $10^{-12}$ g.

The bubble sensor is an instrument which responds to the local net acceleration. When it is stationarily mounted, it is principally responsive to the local gravity vector, although lateral microseisms also provide an acceleration to which it responds, depending upon frequency sensitivity. By determining the relationship of adjacent vectors, microseims are canceled out and gravity gradient, the differences in the two vectors, are established.

SUMMARY

In order to aid in the understanding of this invention, it can be stated in essentially summary form that it is directed to a gravity gradient meter wherein integrating type bubble sensors are disposed horizontally adjacent each end of a stiff elongated resilient member for indicating tangential acceleration present thereat, including that of gravity.

It is, therefore, an object of the present invention to provide a new and improved gravity gradiometer that overcomes the disadvantages of the prior art. It is another object of the present invention to provide a novel technique for constructing horizontal and vertical gradiometers. It is a further object of the invention to provide a gravity gradiometer utilizing integrating type bubble sensors in a novel arrangement wherein the bubbles in the sensors remain relatively stationary.

Other objects and advantages of this invention will become apparent from a study of the following portion of the specification, the claims and the attached drawings.

BRIEF DESCRIPTION OF THE DRAWINGS

FIG. 1 is a diagrammatic illustration of a gravity gradient meter constructed according to the preferred embodiment of the invention, the gradient meter being adapted to measure horizontal components of gradients.

FIG. 2 is a cross-sectional view of the gradient meter of FIG. 1, taken along line 2—2.

FIG. 3 is a schematic illustration of the structure of the electronic equipment of the gravity gradient meter.

DESCRIPTION

Referring to FIG. 1, gravity gradient meter 11 has a relatively stiff deflectable resilient elongated member 13 of quartz, for example, wherein the underside end surfaces 15 are ground optically flat and substantially parallel by conventional means. At these end surfaces are attached flat pans 17 which, with the optically flat surfaces 15, form bubble chambers 19 and 20. The bubble chambers are filled with a liquid, such as ethyl alcohol, with a trace of ammonium nitrate solution to provide proper ionization and in sufficient volume to substantially fill the chambers 19, but allowing enough space for the creation of a substantially flat bubble 21. There is sufficient chamber depth in relation to the liquid surface tension and bubble size that the bubble does not reach the bottom of the chamber. The outer ring, or circumferential ring, of the chamber is of conductive material, as metal, while the bottom of the chamber is nonconductive.

Bubble position sensors in the form of electrodes are positioned in the chamber bottom. They are orthogonally oriented with respect to the length and width of elongated bar 13, as is shown in FIG. 2. These electrodes are positioned substantially flush with the insulated bottom, at least to the extent that they do not protrude to the bottom of the bubble. There is always liquid over the electrodes, regardless of bubble position. A preferred construction of the bubble chambers is well illustrated in my prior U.S. Pat. No. 3,409,993.

The bubble chambers 19 and 20 form portions of level detecting devices. As is seen in FIG. 3, the electrodes in the bottom of each of the bubble chambers are connected so that bubble position can be signaled. Each of the electrodes in the bubble chamber has a resistance to the conductive outer ring which is related to the bubble position. Thus, each electrode to the outer ring of the chamber constitutes a variable resistance. Oscillator 22 is connected to fixed resistances and to the outer ring, while the electrodes are connected to form the output of a bridge. For example, resistances 24 and 26 are both connected to the oscillator and to separate inputs of the modulator 28. The oscillator is also connected to the outer ring of the bubble chamber 19 (through ground or other connection) and, thence, through the variable resistance paths of the liquid to electrodes 30 and 32. These variable resistance paths form the other two legs of the bridge. The electrodes are connected to the same inputs of demodulator 28. Each of the other pairs of electrodes is connected in the same manner.

Should the bubble move, the resistance changes in the variable legs of the bridge. Assuming that the bubble moves in the direction indicated by arrow $e_1$, the signal changes to demodulator 28 to produce an error signal through DC amplifier 34.

The bubbles in the bubble chamber move at a velocity proportional to the error angle. Thus, the bubble displacement is the integral of the error angle with respect to time. When incorporated into a feedback group, the result is to eliminate any steady-state error due to variation in the position of the electrodes or in the system amplifiers.

As a result, the signal on line 36 is an error signal $e_1$ which corresponds to the displacement of the bubble in the $e_1$ direction within bubble chamber 19. Similarly, bubble displacement in the direction $e_2$ in bubble chamber 19 produces a signal $e_2$ in line 38. From FIG. 3, it is clear that the longitudinal electrodes in bubble chamber 20, coupled to demodulator 40 and amplifier 42, produce a signal $e_3$ in line 44 corresponding to bubble displacement in that direction. Similarly, the transversely arranged electrodes in bubble chamber 30 are connected to demodulator 46, which has its output through DC amplifier 48 and 50, to produce a signal $e_4$ therein corresponding to bubble displacement in that direction. A suitable demodulator with these characteristics is Multiplier 4094/15C, manufactured by Burr-Brown Research Corp., of Tucson, Arizona.

Considering the elongated bar 13, and presuming that the underside end surfaces 15 lie in the same plane, the bubbles in each of the bubble chambers lie against these surfaces. In the absence of any gravity anomaly, the gravity vectors through the bubble levels converge by an amount which can be calculated from the equation of the spheroid. In the presence of an anomaly, the convergence would differ from the standard amount, the difference being a measure of the intensity of the anomaly.

Bending or twisting of bar 13 can be accomplished to return the bubbles to a stationary condition. Physical support of bar 13 is provided by spring 52, which is positioned between bar 13 and base 54, which base is supported at the location at which the anomaly is being detected. Spring 52 is a high-rate spring, preferably formed as a fused quartz bellows. Positioned around the spring 52 are four force motors 56, 58, 60, and 62. These force motors can be of any convenient construction, and they are preferably formed with a permanent magnet 64 having an annular flux gap therein, and an electric coil 66 within the gap, within the flux. The electric coil 66 is connected by line 68 to the electronics, generally indicated at 70 in FIG. 1. The four force motors 56 through 62 are arranged around the centrally located spring 52.

It is clear that different energization of these different force motors results in tilting of the bar, both longitudinally and transverse, bending of the bar along its longitudinal axis and twisting of the bar about its longitudinal axis. The proper forces applied to the various force motors, as a function of the error signals $e_1$ through $e_4$, is deduced as follows. Considering the four force motors 56 through 62 as being respectively identified as F1, F2, F3, and F4, considering movement of the bubbles in the directions of arrows $e_1$ through $e_4$ as being in the position direction, and considering tension in the force motors as being in the positive direction, the four conditions of tilt and twist can be set forth, as follows:

$$F_1 + F_2 - F_3 - F_4 = e_1 + e_3 \quad (1)$$
$$-F_1 + F_2 - F_3 + F_4 = e_2 + e_4 \quad (2)$$
$$-F_1 + F_2 + F_3 - F_4 = e_2 - e_4 \quad (3)$$
$$F_1 + F_2 + F_3 + F_4 = e_1 - e_3 \quad (4)$$

Equation 1 states that, if the bubbles move in the direction of arrows $e_1$ and $e_3$, to correct this situation, more compression is required on force motors F1 and F2 and less compression on force motors F3 and F4. This causes rocking of the bar about lateral axis through the spring. Equation 2 tells us that, if the bubbles tend to move in the direction of arrows $e_2$ and $e_4$, more compression is required on force motors F2 and F4 and less compression is required on force motors F1 and F3. This rocks the bar about a longitudinal axis to stop motion of the bubbles.

Equation 3 tells us that, if one bubble goes in the direction of arrow $e_2$ and the other goes opposite the direction of arrow $e_4$, there is twist in the bar and this is overcome by more compression in force motors F2 and F3 and less compression in force motors F1 and F4. The force motors thus set up a twist in the bar to reduce the bubble velocity to zero. Finally, equation 4 tells us that, if the one bubble goes in the direction of arrow $e_1$ and the other goes in the opposite direction to arrow $e_3$, bending is required in the bar. This is accomplished by increasing the compression of all four of the force motors.

From these expressions, the following is algebraically deduced:

(5) = (1) + (2)    $2F_2 - 2F_3 = e_1 + e_2 + e_4$
(6) = (1) − (3)    $2F_1 \quad -2F_3 = e_1 + e_3 - e_2 + e_4$
(7) = (1) + (4)    $2F_1 + 2F_2 \quad = 2e_1$
(8) = (5) − (6)    $-2F_1 + 2F_2 \quad = 2e_2$
(9) = (7) − (8)    $4F_1 \quad = 2e_1 - 2e_2$
(10) = (9) ÷ 2    $2F_1 \quad = e_1 - e_2$
(11) = (10) into (7)  $2F_2 \quad = e_1 + e_2$
(12) = (10) into (6)    $2F_3 = -e_3 - e_4$
(13) = (10), (11), (12) into 2 × (4)
$\quad e_1 - e_2 + e_1 + e_2 - e_3 - e_4 + 2F_4 = 2e_1 - 2e_3$
(14)    $2F_4 = -e_3 + e_4$ In summary, it can be seen that the energization of the force motors 56 through 62 is as follows:

$F_1 = K(e_1 - e_2)$
$F_2 = K(e_1 + e_2)$
$F_3 = K(-e_3 - e_4)$
$F_4 = K(-e_3 + e_4)$

Referring to FIG. 3, the outputs into lines 36, 38, 44, and 50 respectively represent the error signals $e_1$ through $e_4$. Various combinations are made to properly energize the force motors, as indicated in the summary above. Thus, $e_1 - e_2$ is accomplished by algebraic adder 72. Its output is connected through amplifier 74 to supply the necessary constant. The output is through line 68 to force motor 56. Thus, F1 force motor 56 is energized in accordance with the first line in the summary above. Similarly, $e_1$ and $e_2$ are added in adder 76, which supplies its signal through amplifier 78 to F2 force motor 58.

The $-e_3$ and $-e_4$ signals are algebraically added in adder 80 which has a signal output through amplifier 82 to F3 force motor 60. Finally, the $-e_3$ and $+e_4$ signals are algebraically added in adder 84 which has its output through amplifier 86 to F4 force motor 62. By this means, bending and rocking the bar is continually accomplished to permit the bubble in both bubble chambers to remain stationary, even in the presence of a gravity anomaly. Because the small correcting motions result from the application of large forces to a stiff central spring 52, the system is insensitive to external stray forces. With this spring being made of fused quartz, for example, it is mechanically stable and relatively unaffected by thermal gradients.

The total gradient is that which is most usually required, and this is obtained by summing the signals to all four of the force motors. Thus, the input lines to each of the force motors 56 through 62 are each also connected to adder 88, which provides to total corresponding to the sum of the forces F1 + F2 + F3 + F4. Its output is indicated on readout 90. Readout 90 can be a visual or recorded output.

The main bar 13 is also in the form of a spring, the deflectability of which is used in the gradient measurement. Since it is also desirable for this to be as stable as possible, a preferred structure is a quartz bar. Gravity gradients are commonly measured in Eotvos units, where one Eotvos unit is equal to $10^{-10}$ g per meter. Where the main bending bar 13 measures 4 × 6 × 18 inches, the sum of the forces F1 through F4 to readout 90 which corresponds to one Eotvos unit is approximately $1.6 \times 10^{-3}$ pounds, or 0.73 grams. A similar structure can be arranged upon a vertically oriented bar, so that vertically separated gravity anomalies can be detected. Such can be accomplished by turning the entire structure illustrated in FIG. 1, except the bubble chambers, into a right angle, upright position. In this situation, vertical gradients can be mapped.

As a specific example of equipment, oscillator 22 is a 2,500 cycle oscillator. About 3 volts is normally a satisfactory value for the exciting energization, but this depends upon the depth of the liquid between the bottom of the bubble and the top of the electrodes. The value of the fixed bridge resistors, of which resistors 24 and 26 are examples, are chosen so that they are conveniently about equal to the median value of the variable resistances in the bubble chamber.

Demodulator 28, and the other demodulators, are such that the bubble displacement is read out of the demodulator. An example of a suitable electronic device to accomplish this signal from the bridge output is a variable transconductance multiplier, described above. The amplifiers which amplify the demodulator outputs are conventional DC amplifiers, such as a Burr-Brown 3264/14 Instrumentation Amplifier. The amplifiers from the algebraic adders to the force motors can be Burr-Brown 3069/49 High-current booster amplifiers.

Adders 72, 76, 80, and 84 are conventional analog algebraic adders, such as resistor networks connected to the input of the instrumentation amplifier. Finally, the adder 88 can be of the same nature.

From the foregoing, it is seen that the invention provides a novel and advantageous gravity gradiometer capable of a high degree of sensitivity, accuracy and stability which can be arranged so that it is capable of measuring horizontal and vertical gradients of gravity. It is stressed that the materials and equipment described for use in fabricating embodiments of the invention are not the only ones usable and that other materials or equipment having similar characteristics may be substituted therefor.

This invention having been described in its preferred embodiment, it is clear that it is susceptible to numerous modifications and embodiments within the ability of those skilled in the art and without the exercise of the inventive faculty.

What is claimed is:

1. A gravity gradient meter comprising:
    a resilient member having first and second mounting locations thereon spaced laterally with respect to a local gravity vector;
    first and second local gravity vector sensing devices respectively secured to said resilient member at said first and second spaced mounting locations thereon, each of said gravity vector sensing devices having an output when the local gravity vector is away from a reference axis of said gravity vector sensing device;
    connection means connected to receive the outputs from said first and second sensing devices for indicating the gravity gradient between said first and second local gravity sensing devices; and
    force means connected to said connection means for receiving signals corresponding to the sensing device outputs and connected to said resilient member for bending said resilient member in response to the outputs from said gravity vector sensing devices to bend said resilient member so that the reference axes of said first and second sensing devices are moved toward parallelism with their respective local gravity vectors.

2. The gravity gradient meter of claim 1 wherein each of said local gravity vector sensing devices comprises a liquid containing bubble chamber having a flat surface under which the bubble is located and electrodes in each of said bubble chambers detecting the position of the bubble therein.

3. The gravity gradient meter of claim 2 wherein said force means includes a plurality of force motors connected to said resilient member to bend said resilient member when said force motors are energized so that the surfaces under which the bubbles are positioned are normal to the local gravity vector.

4. The gravity gradient meter of claim 3 wherein said force means comprises at least five force points on said resilient member, including said force motors, so that said resilient member can be rocked, bent and twisted in response to the gradient between the local gravity vector at said two local gravity vector detecting devices.

5. The gravity gradient meter of claim 4 wherein said force means connected to said resilient member comprises a post, and four spaced force motors.

6. The gravity gradient meter of claim 5 wherein said force motors are positioned around said post, said post comprising a resilient post, said each of said force motors comprising a coil in a magnetic field so that variation in coil energization varies the force of said force motor.

7. The gravity gradient meter of claim 2 wherein power supply means is connected to each of said bubble chambers for applying an electrical signal to the liquid in each of said bubble chambers, so that said electrodes electrically detect the bubble position in each of said bubble chambers.

8. The gravity gradient meter of claim 7 wherein said electrodes are connected to an electric bridge, the electric input to said electric bridge being said power supply means and the electric output of said bridge being connected to said force means.

9. The gravity gradient meter of claim 8 wherein said power supply means is an oscillator and the output of said bridge is connected to a demodulator so that the demodulator output electric signal is a DC signal related to bubble position with respect to said electrodes.

10. The gravity gradient meter of claim 9 wherein there are first and second orthogonally arranged pairs of electrodes in one of said bubble chambers, with each of said pairs being respectively connected to first and second demodulators;
    said force means comprising first and second force motors connected to bend said resilient member, the output signals of said first and second demodulators being connected to both first and second adders and being algebraically added in different ways and connected to said first and second force motors.

11. The gravity gradient meter of claim 10 wherein there are two pairs of orthogonally arranged electrodes in said second bubble chamber, arranged on substantially the same orthogonal axes as the electrodes in said first bubble chamber;
    third and fourth demodulators respectively connected to each of said pairs and said second bubble chamber, the output of said third and fourth demodulators being connected to both third and fourth adders and being algebraically added in different ways;
    third and fourth force motors connected to bend said resilient member, the output of said third and fourth adders being respectively connected to said third and fourth force motors.

12. The gravity gradient meter of claim 11 wherein the inputs to said four force motors are connected to summing means and are summed together for producing a sum related to the gravity gradient between said first and second local gravity vector sensing devices.

* * * * *